United States Patent
Burns et al.

(10) Patent No.: US 8,239,849 B2
(45) Date of Patent: Aug. 7, 2012

(54) CLASS LOADING DELEGATION NETWORK

(75) Inventors: Simon Edward Burns, Hampshire (GB); Lakshmi Shankar, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 11/943,335

(22) Filed: Nov. 20, 2007

(65) Prior Publication Data

US 2008/0127157 A1    May 29, 2008

(30) Foreign Application Priority Data

Nov. 24, 2006   (GB) .................................. 0623426.4

(51) Int. Cl.
*G06F 9/45* (2006.01)

(52) U.S. Cl. .................. 717/166; 717/163; 717/165

(58) Field of Classification Search ........... 717/162–166
See application file for complete search history.

(56) References Cited

U.S. PATENT DOCUMENTS

| 6,748,396 B2* | 6/2004 | Klicnik et al. ................... 1/1 |
| 2002/0046304 A1* | 4/2002 | Fabri et al. .................... 709/331 |
| 2003/0163481 A1* | 8/2003 | Blohm .......................... 707/102 |
| 2004/0019887 A1* | 1/2004 | Taylor et al. .................. 717/166 |
| 2006/0271922 A1* | 11/2006 | Chan et al. ................... 717/166 |

OTHER PUBLICATIONS

Li Gong; Secure Java Class Loading; 1998 IEEE; pp. 56-61.*
Liang et al., Dynamic Class Loading in the JavaTM Virtual Machine; Oct. 1998; ACMSIGPLAN; pp. 1-9.*
Michael Warres; Class Loading Issues in Java™ RMI and Jini™ Network Technology; Jan. 2006, Sum Microsystems Laboratories; pp. 1-31.*

* cited by examiner

*Primary Examiner* — Wei Zhen
*Assistant Examiner* — Satish Rampuria
(74) *Attorney, Agent, or Firm* — Novak Druce + Quigg LLP (57) ABSTRACT

A method for a first software component in a class loading delegation network to obtain a class definition for a serialized software object, the software object implementing a software interface defined by a second software component and having associated a class defined by a third software component, the method comprising the steps of: obtaining a reference to the third software component from the class loading delegation network using an identifier of the software interface and requesting the class from the third software component.

11 Claims, 5 Drawing Sheets

CLASS LOADING DELEGATION NETWORK

CROSS-REFERENCE TO RELATED APPLICATION

This application claims the benefit of British Patent Application No. 0623426.4, filed on Nov. 24, 2006, which is incorporated by reference herein in its entirety.

FIELD OF THE INVENTION

The present invention relates to a class loading delegation network, and, more particularly, to deserializing objects in a class loading delegation network.

BACKGROUND OF THE INVENTION

In an object oriented software runtime environment, such as a Java environment (Java is a registered trademark of Sun Microsystems Inc.), software objects can be serialized from a runtime state to a serialized state. Such serialization involves recording a serialized form of an object to a storage medium. Such a serialized form can include a serial binary representation of an object. Serialization is useful since it provides a mechanism for recording instantiated software objects in such a way that the objects can be communicated between or within applications, between runtime environments or between physical devices such as computer systems. Such serialized objects can be deserialized to a runtime state. In order to achieve deserialization, a definition is required of an implementing class of which a serialized object is an instance. In a standard runtime environment such implementing class definitions are normally available to facilitate deserialization and can be loaded by a class loader as required. In some other environments, however, access to such class definitions can be problematic.

One such other environment is a class loading delegation network, such as that found in a module system such as the Open Services Gateway initiative (OSGi) framework (OSGi is a registered trademark of the OSGi Alliance). OSGi is a Java module system providing for the componentization of Java applications into software components. In OSGi, such software components are known as 'bundles' and can be implemented in Java archive files known as JAR files. Software components in such a class loading delegation network interoperate by exporting, and respectively importing, resources such as classes, interfaces and packages. For example, a first software component in such a system can export an interface definition for use by classes defined in a second software component in the system. Each software component has associated a class loader which is operable to load a class for use by the software component. A software component deserializing an object in such a class loading delegation network will require access to the implementing class for the object. In the event that the implementing class is not available within the software component the component may be unable to successfully deserialize the object.

One solution to overcome this problem is to make the definition of serializable classes specifically available to software components in such a class loading delegation network. For example, in OSGi it is possible for a software component to provide a 'service', such as access to objects, to other software components. In this way, a class definition for an implementing class can be made available to software components for the purpose of deserializing objects. However, this approach has the significant drawback that software component code is required to change to support the use of such services as part of the deserialization process.

It would therefore be advantageous to provide for the deserialization of a serialized software object in a class loading delegation network such as a module system without requiring changes to software component code for the deserialization.

SUMMARY OF THE INVENTION

The present invention accordingly provides, in a first aspect, a method for a first software component in a class loading delegation network to obtain a class definition for a serialized software object, the software object implementing a software interface defined by a second software component and having associated a class defined by a third software component. The method can include the steps of obtaining a reference to the third software component from the class loading delegation network using an identifier of the software interface and requesting the class from the third software component. Thus, in this way, the first software component is able to access the class definition for the serializaed software object from the third software component.

The method can further include the step of requesting the class from the second software component, the second software component providing feedback to the request, wherein the steps of obtaining a reference to the third software component and requesting the class from the third software component are in response to the feedback from the second software component.

The feedback can comprise an indication that the second software component is unable to provide the class, the steps of obtaining a reference to the third software component and requesting the class from the third software component being performed in response to the indication that the second software component is unable to provide the class.

The third software component can store an entry for the class in a data structure accessible by each of the first and third software components, the entry having associated an identifier of the software interface. The class loading delegation network can be an Open Services Gateway initiative (OSGi) framework, and the first, second and third software components are bundles executable in the OSGi framework. The method can further comprise, in response to a determination that the third software component is unable to provide the class, the step of, in response to a determination that the third software component re-exports a set of exported software packages of the second software component, undertaking the following steps: a) obtaining a reference to a fourth software component from the class loading delegation network, the fourth software component importing software packages from the third software component; and b) requesting the class from the third software component.

The present invention accordingly provides, in a second aspect, an apparatus for a first software component in a class loading delegation network to obtain a class definition for a serialized software object, the software object implementing a software interface defined by a second software component and having associated a class defined by a third software component. The apparatus can include means for obtaining a reference to the third software component from the class loading delegation network using an identifier of the software interface and means for requesting the class from the third software component.

The present invention accordingly provides, in a third aspect, an apparatus comprising: a central processing unit; a memory subsystem; an input/output subsystem; a bus subsystem interconnecting the central processing unit, the memory subsystem, the input/output subsystem; and an apparatus for a first software component in a class loading delegation network to obtain a class definition for a serialized software object, as described above.

The present invention accordingly provides, in a fourth aspect, a computer program element, such as a computer-readable medium comprising computer program code embedded therein, such that, when loaded into a computer system and executed thereon, causes the computer to perform the steps of a method for a first software component in a class loading delegation network to obtain a class definition for a serialized software object, as described above.

BRIEF DESCRIPTION OF THE DRAWINGS

A preferred embodiment of the present invention is described below in more detail, by way of example only, with reference to the accompanying drawings, in which.

DETAILED DESCRIPTION

Figure 1:
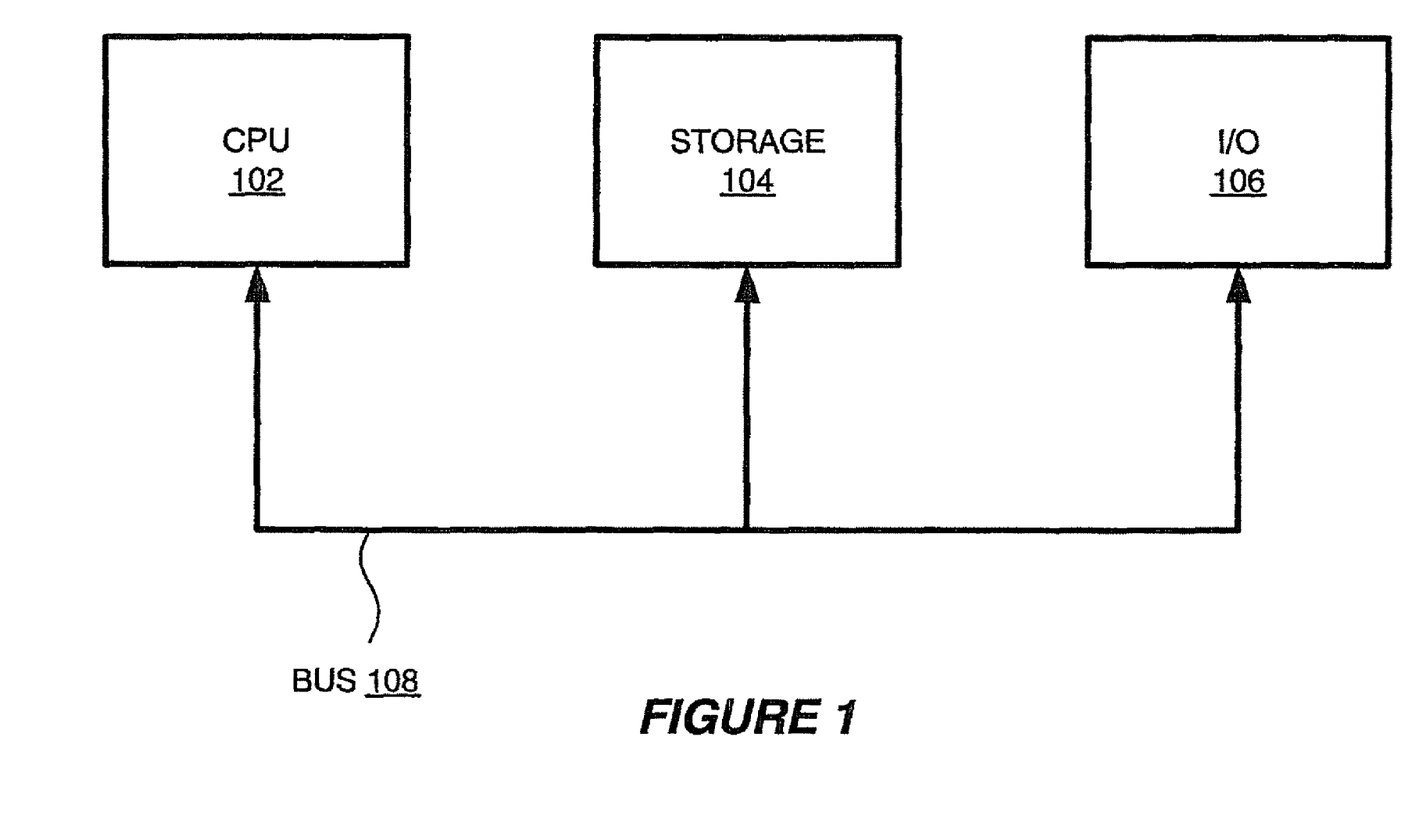
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2A:
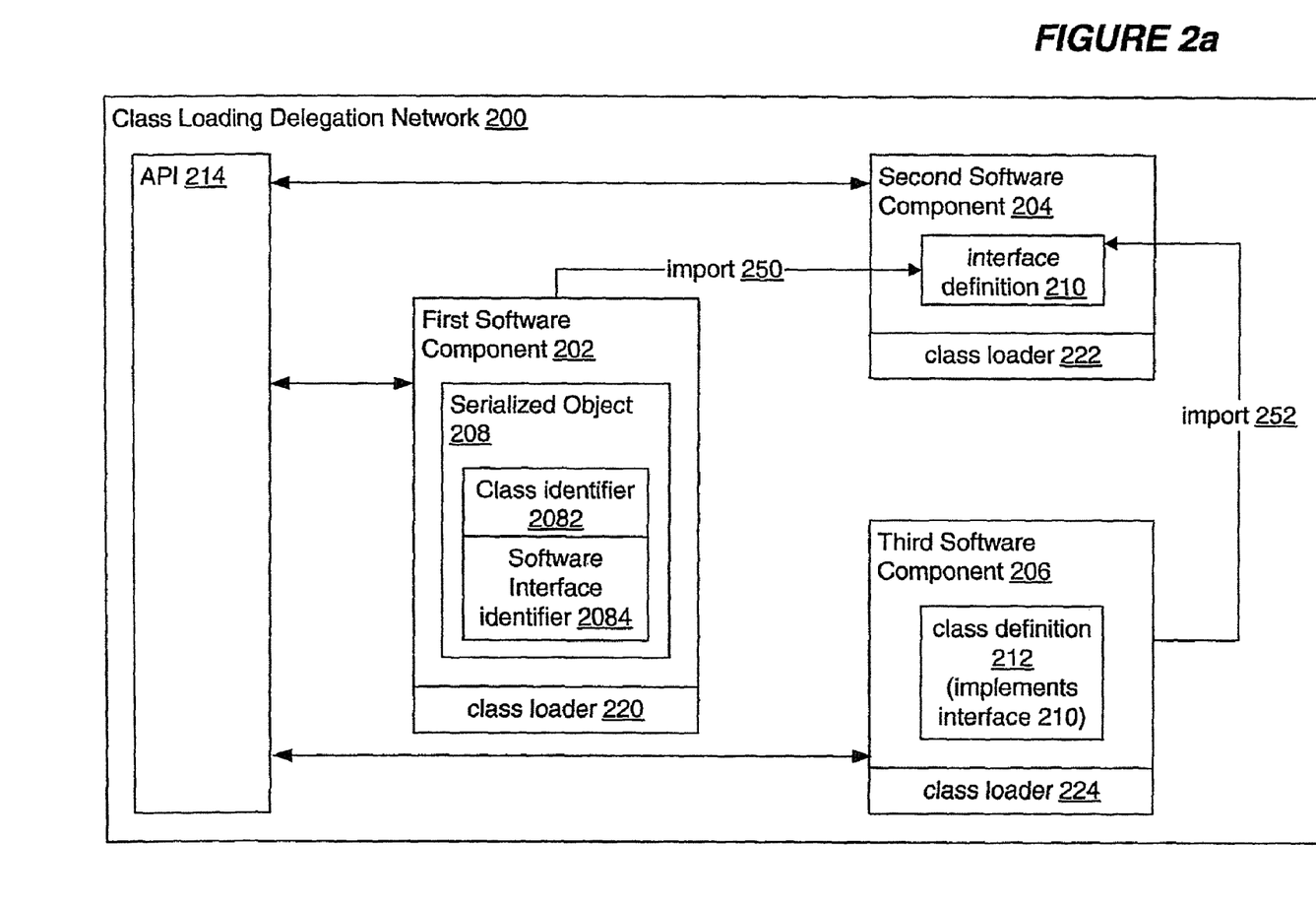
FIG. 2a is a block diagram of an exemplary class loading delegation network having a first, second and third software components in accordance with a preferred embodiment of the present invention.

FIG. 2a is a block diagram of an exemplary class loading delegation network 200 having first 202, second 204 and third 206 software components in accordance with a preferred embodiment of the present invention. The class loading delegation network 200 is a software module system such as an OSGi framework as defined in the "OSGi Service Platform Core Specification" (The OSGi Alliance, Release 4, Version 4.0.1, July 2006) available on the world wide web at "osgi.org". The class loading delegation network 200 is illustrated as comprising: a first software component 202 having associated a class loader 220; a second software component 204 having associated a class loader 222; and a third software component 206 having associated a class loader 224.

Class loaders 220, 222 and 224 are functional components operable to locate and load an identified class definition from a repository of classes. Notably, the class loader 220 is local to the first software component 202 and so is operable to load classes associated with the first software component 202. Class loader 222 is local to the second software component 204 and so is operable to load classes associated with the second software component 204. Similarly, class loader 224 is local to the third software component 206 and so is operable to load classes associated with the third software component 206.

The first software component 202 comprises a serialized object 208. The serialized object 208 is a serial representation of an instantiated software object, such as a Java object. The serialized object 208 is an instance of a serializable software class 212 identified by a class identifier 2082. The class 212 is a definition of the structure and content of a class data structure, such as a Java class, and can include a definition of fields and methods. The class 212 includes an indicator that it is serializable (such as by implementing a serializable interface) such that instances of the class 212 can be serialised and deserialized. The class 212 is not defined within the first software component 202 and so is not readily loadable by the class loader 220. Instead, a definition for the class 212 is provided in a third software component 206 as a class which implements a software interface 210, such as a Java interface. A software interface is an abstract definition of software methods which are supported by instances of classes which implement the software interface. The class 212 implements the interface 210 and so provides the software methods defined in the interface 210. Further, the serialized object 208, which is an instance of the class 212, is also an instance of the interface 210. For this reason, the serialized object 208 farther comprises an identifier 2084 of the software interface 210.

The software components 202, 204 and 206, can include a definition of resources which they require from other of the software components known as 'imports.' Similarly, software components 202, 204 and 206, can include a definition of resources which they make available to other of the software components known as 'exports.' In the exemplary arrangement of FIG. 2a, second software component 204 exports the interface definition 210 for import by the first and third software components 202, 206. These imports are resolved at runtime by the class loading delegation network 200 by the creation of linkages 250 and 252, such as linkages in OSGi known as 'wires,' between the software components. The linkage 250 corresponds to the importation of the interface definition 210 by the first software component 202. Similarly, the linkage 252 corresponds to the importation of the interface definition 210 by the third software component 206.

The class loading delegation network 200 further includes application programming interface (API) functions 214. For example, the OSGi framework provides an API function for the provision of a list of software components which import a specified interface.

In use, the first software component 202 deserializes the serialized object 208. The deserialization requires access to the class definition 212 as identified 2082 in the serialized object 208. If the first software component 202 attempts to load the identified class 2082 using its local class loader 220, this will fail since the local class loader 220 has no access to a definition of the class 212. Accordingly, the first software component 202 obtains a reference to the third software component 206 from the class loading delegation network 200 using the identifier 2084 of the software interface 210. This can be achieved by invoking an API function 214 of the class loading delegation network 200 for providing the software components which import the identified interface 2084. Such an API function 214 will provide a reference to the third software component 206 since the third software component 206 imports the interface 210. Subsequently, using this reference to the third software component 206, the first software component 202 can request the third software component 206 to load the class 212 identified by the class identifier 2082. The third software component 206 will successfully load the class definition 212 using its local class loader 224 since the class definition 212 is included in the third software component 206. The third software component 206 subsequently provides the loaded class definition 212 to the first software component 202. Thus, in this way, the first software component 202 is able to access the class definition 212 for the identified class 2082 in order to deserialize the serialized object 208.

In an alternative embodiment, the first software component 202 requests the software component supplying the definition of the interface 210 to load the class 212 identified by the class identifier 2082. The first software component 202 initially requests the second software component 204 to attempt to load the class definition 212. In this alternative embodiment, the first software component 202 only obtains a reference to the third software component 206 if the second software component 204 is unable to load the class definition 212. This has the advantage that the steps of obtaining a reference to the third software component 206 are avoided in the event that the software component 204 supplying the interface definition 210 also includes the class definition 212 (which, in the exemplary arrangement, it does not).

The third software component 206 will successfully load the class definition 212 using its local class loader 224 since the class definition 212 is included in the third software component 206. The third software component 206 subsequently provides the loaded class definition 212 to the first software component 202. Thus, in this way, the first software component 202 is able to access the class definition 212 for the identified class 2082 in order to deserialize the serialized object 208.

Figure 2B:
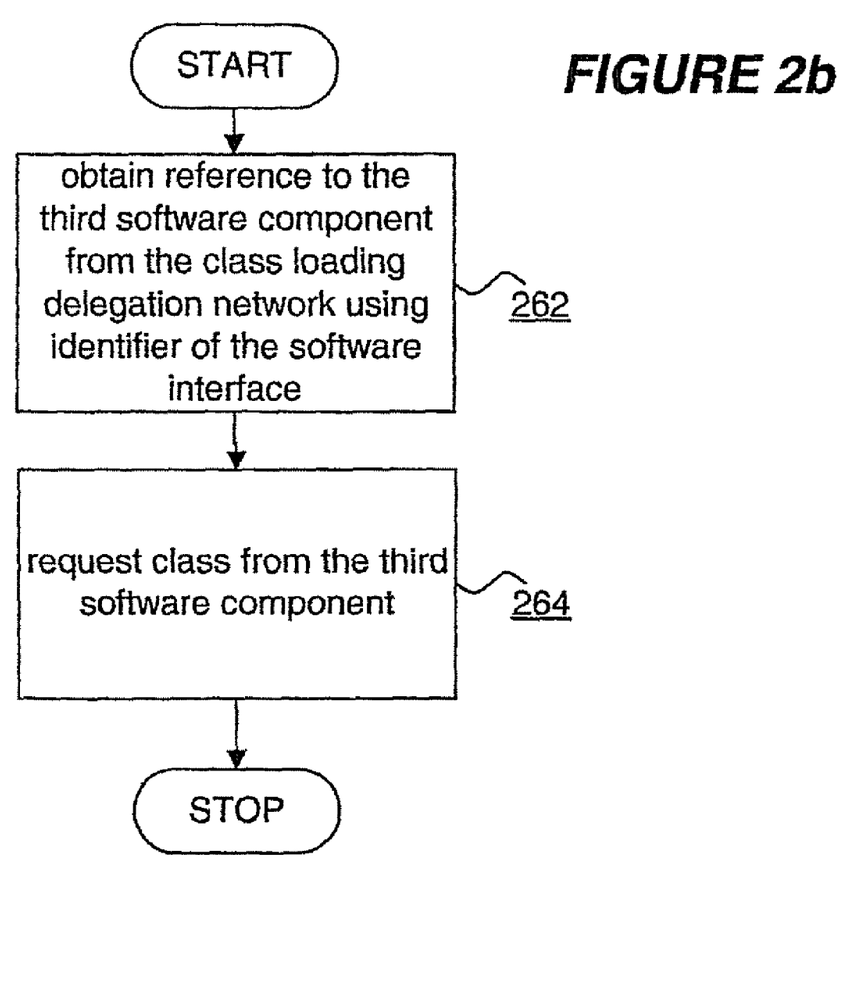
FIG. 2b is a flowchart of a method in accordance with a preferred embodiment of the present invention.

FIG. 2b is a flowchart of a method in accordance with a preferred embodiment of the present invention. Initially, at step 262, the first software component 202 obtains a reference to the third software component 206 from the class loading delegation network 200 using the identifier 2084 of the software interface 210 in the serialized object 208. Subsequently, at step 264, the first software component 202 requests the class definition 212 of the class identified 2082 by the serialized object 208 from the third software component 206.

Figure 3:
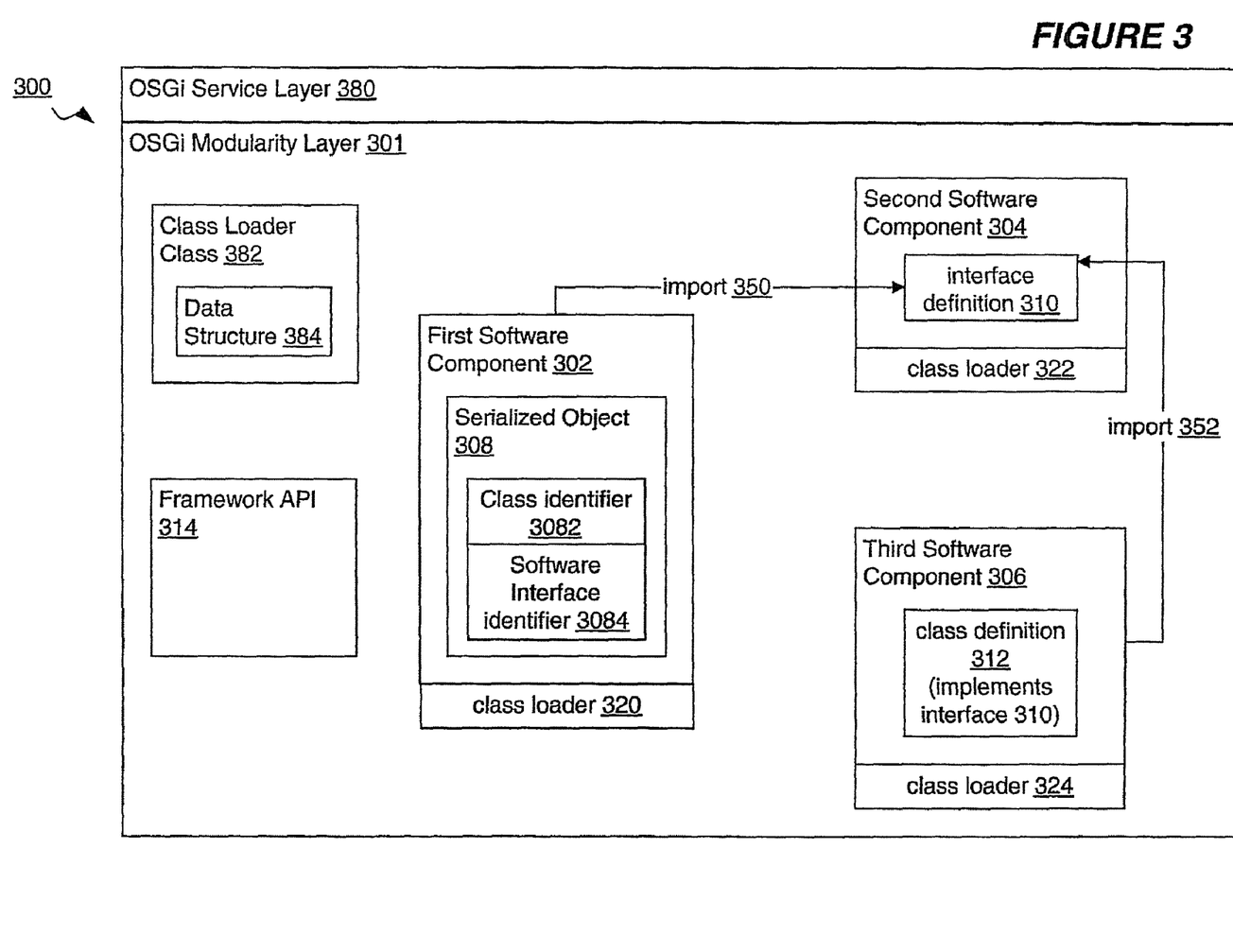
FIG. 3 is a block diagram of an exemplary OSGi framework in accordance with a preferred embodiment of the present invention.

FIG. 3 is a block diagram of an exemplary OSGi framework 300 in accordance with a preferred embodiment of the present invention. The OSGi framework 300 of FIG. 3 includes a OSGi modularity layer 301 and an OSGi service layer 380. It will be apparent to those skilled in the art that the OSGi framework 300 will include other layers in addition to those illustrated and these are excluded from FIG. 3 for clarity. The OSGi service layer 380 is a part of the OSGi framework 300 which facilitates the provision of services by software components, such as the making available of software objects by software components to other software components. The OSGi modularity layer 301 includes first, second and third software components 302, 304 and 306 which are identical to those described above with respect to FIG. 2. In the OSGi framework 300 of FIG. 3, the first, second and third software components 302, 304 and 306 are OSGi bundles embodied as Java archive (JAR) files of Java classes and interfaces. The OSGi modularity layer 301 further includes a class loader class definition 382 of which each of the class loaders 320, 322 and 324 is an instance. The class loader class definition 382 includes a static data structure 384 suitable for the storage of class information. The static nature of the data structure 384 provides that a single state of the data structure is simultaneously accessible to each instance of the class loader class 382. Thus, each of class loaders 320, 322 and 324 are able to read from, and write to, the data structure 384. The data structure 384 is used to store information relating to serializable classes, such as class 312 defined in the third software component 306. The information stored in the data structure 384 for each serializable class includes a class identifier and a list of one or more software interfaces implemented by the class. For this purpose, the data structure is preferably a map data structure for the storage of key/value pairs. The key of each map entry is preferably an identifier of a class, and the value of each map entry is a list of one or more interfaces implemented by the class. It will be apparent to those skilled in the art that other data structures may be employed to store the same information, such as lists, linked lists or tables.

Figure 4:
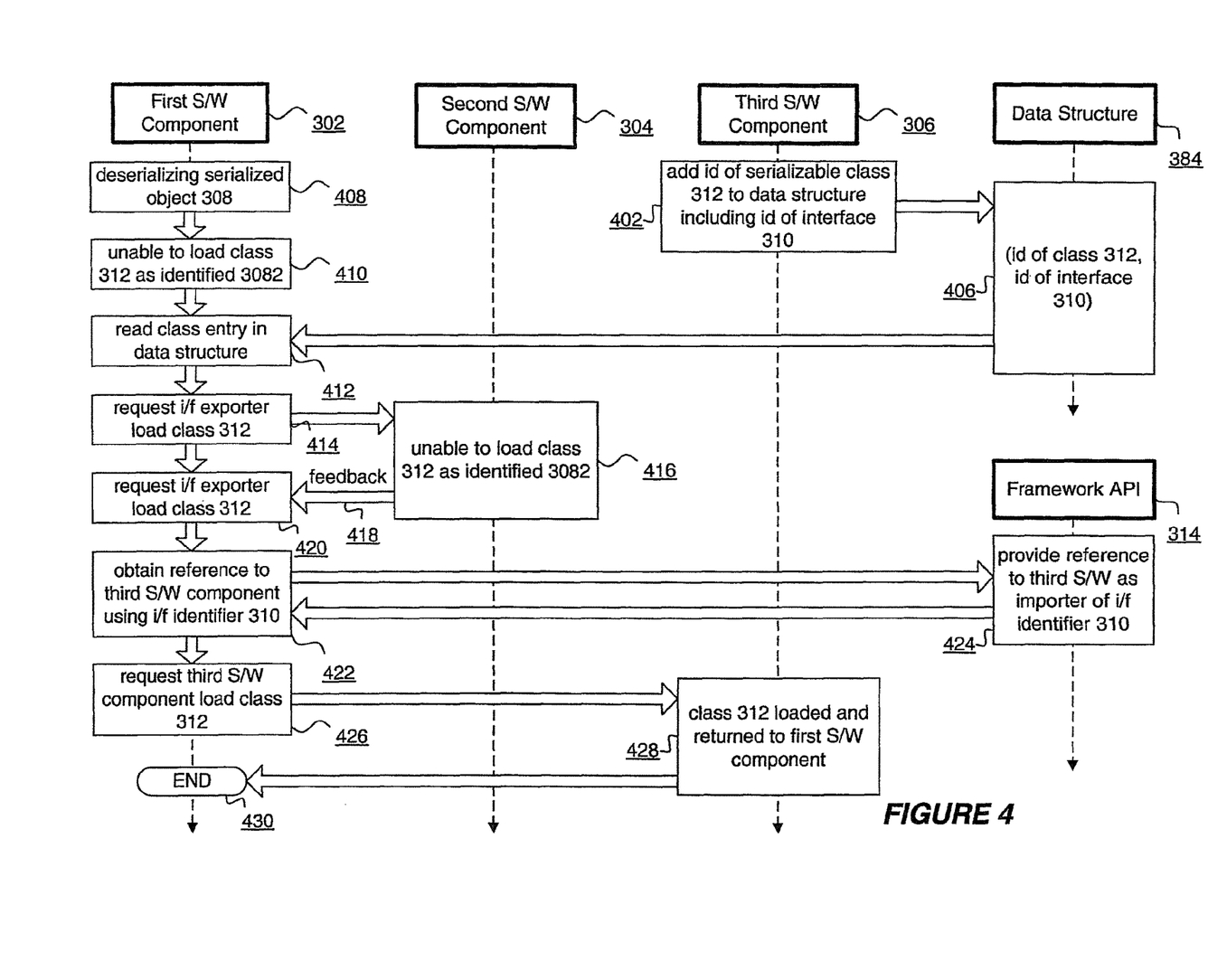
FIG. 4 is a state diagram of the exemplary OSGi framework of FIG. 3 in use in accordance with a preferred embodiment of the present invention.

The arrangement of FIG. 3 will now be considered in use with reference to the state diagram of FIG. 4. A software component including a serializable class definition will add an entry to the data structure 384. Thus, in the exemplary arrangement of FIG. 3, the third software component 306 adds an entry to the data structure 384 for the serializable class 312 at step 402. An identifier of the class 312 is stored in the data structure 308 along with an identifier of the interface 310 implemented by the class 312 at step 406. The data structure 384 is accessible to the third software component 306 by way of the class loader 324 since the data structure 384 is a static field in the class loader class 382 of which the class loader 324 is an instance. In one embodiment, an entry for a class is added to the data structure 384 when the serializable class is first loaded by a software component. Alternatively, an entry for a class can be added to the data structure 384 at a specific point in the lifecycle of a software component which includes the class. For example, the entry for the class can be added to the data structure 384 when the software component is resolved (i.e., when the linkages between the software component and other software components in the OSGi framework 300 are resolved, such as by the creation of wires). In a further alternative, the entry for the class can be added to the data structure 384 when the software component is 'started,' which is a recognized state for a software component such as a bundle in an OSGi framework.

Subsequently, a software component deserializing a serialized object which is an instance of a class listed in the data structure 384 can seek to load the class using the interface information stored in the data structure 384 for the class. Thus, at step 408 for the exemplary arrangement of FIG. 3, the first software component 302 seeks to deserialize the serialized object 308 which is an instance of the class 212 as identified by the class identifier 3082. Initially, the first software component 302 attempts to load the class 312 using its own class loader 320 at step 410. Since a definition for the class 312 is not available to the first software component 302, it is unable to load the class 312 in this way. Subsequently, at step 412, the first software component 302 locates an entry in the data structure 384 corresponding to the class identifier 3082 for the serialized object 308. The data structure 384 is accessible to the first software component 302 by way of the class loader 320 since the data structure 384 is a static field in the class loader class 382 of which the class loader 320 is an instance. The third software component 306 previously added an entry for the class 312 to the data structure 384 at step 402 and so the first software component 302 is able to locate an entry for the class 312 in the data structure 384. The entry in the data structure 384 for the class 312 includes a list of the interfaces implemented by the class 312.

The first software component 302 subsequently iterates through each interface implemented by the class 312. In the exemplary embodiment of FIG. 3 only one interface 310 is implemented by the class 312. For each interface 310, the first software component 304 requests, at step 414, that the software component supplying the definition of the interface 310 load the class 312 identified by the class identifier 3082. This is a logical first step in attempting to load the class 212 since the first software component 302 is aware that the class 312 implements the interface 310, and so it is reasonable to request that the software component supplying the interface 310 (i.e. the second software component 304) attempts to load the class 312 at step 416. In the exemplary arrangement of FIG. 3, however, the second software component 304 which supplies the definition of the interface 310 is unable to load the class 312 since it is not available to the class loader 322 of the second software component 304. The second software component 304 provides feedback 418 to the first software component 302 to indicate whether it was able to load the class 312.

If, as is the case in the arrangement of FIG. 3, the second software component 304 supplying the interface definition 310 is unable to load the class 312, the first software component 302 obtains a reference to each software component importing the interface definition 310 at step 422. Such a reference can be obtained using the framework API 314 which provides such facilities in an OSGi environment. The framework API 314 provides, at step 424, the first software component 302 with a reference to the third software component 306 which also imports 352 the interface definition 310. Subsequently, the first software component 302 requests that the third software component 306 load the class 312 at step 426. The third software component 306 is able to load the class 312 at step 428 using the class loader 324 since the class definition 312 is accessible to the third software component. The third software component 306 subsequently provides the loaded class 312 to the first software component 302 to facilitate the deserialization of the serialized object 308.

In some embodiments of the present invention (not illustrated), the third software component 306 may not include the definition of the class 312 but instead it may re-export the definition of the interface 310 which is imported from the second software component 304 to another, fourth, software component which itself includes the class definition 312. For example, in OSGi such re-exportation of imported resources can be implemented using metadata associated with the third software component 306 such as "visibility:=reexport," as will be familiar to those skilled in the art. In such a case, the method described above will not be able to locate a definition of the class 312. To overcome this obstacle, the method can be supplemented by a determination as to whether the third software component 306 re-exports a set of exported resources (such as software packages including classes and interfaces). For example, this determination can be made in the OSGi environment by analyzing metadata associated with the third software component to locate a "visibility:=reexport" item. Such metadata can be included in a manifest of a JAR file for the software component. If the method determines that the third software component 306 does re-export the set of exported resources, the method can obtain a reference to the fourth software component which imports resources from the third software component 306. The framework API 314 is operable to provide such reference to the fourth software component. Subsequently, the fourth software component can be requested to load the class definition 312. Such an approach can be recursive where multiple software components re-export resources in a chain.

In an alternative embodiment, the third software component 306 includes metadata, such as a manifest for a JAR file associated with the third software component. The metadata includes an indication of which classes in the JAR file for the third software component 306 are serializable and for which it is desired to create an entry in the data structure 384. In this way it is possible for the third software component 306 to include a serializable class which is not included in the data structure 384 in the event that the class is determined to be private to the third software component.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk or the like, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

We claim:

1. A method for a first software component in a class loading delegation network to obtain a class definition for a serialized software object, the software object implementing a software interface defined by a second software component and having associated a class defined by a third software component unrelated to the first software component, the method comprising, performing via at least one processor, the steps of:

accessing an application programming interface (API) of the class loading delegation network that maintains a list of software components that import interfaces in the class loading delegation network, the API being separate from the first software component, the second software component, and the third software component;

obtaining a reference to the third software component from the API of the class loading delegation network using an identifier of the software interface;

requesting the class from the third software component;

requesting the class from the second software component, the second software component providing feedback to the request; wherein the steps of obtaining a reference to the third software component and requesting the class from the third software component are in response to the feedback from the second software component; and wherein the feedback comprises an indication that the second software component is unable to provide the class, and the steps of obtaining a reference to the third software component and requesting the class from the third software component are in response to the indication that the second software component is unable to provide the class.

2. The method of claim 1, wherein the third software component stores an entry for the class in a data structure accessible by each of the first and third software components, the entry having associated an identifier of the software interface.

3. The method of claim 1, wherein the class loading delegation network is an Open Services Gateway initiative (OSGi) framework, and the first, second and third software components are bundles executable in the OSGi framework.

4. The method of claim 3, further comprising, in response to a determination that the third software component is unable to provide the class definition, the steps of:
in response to a determination that the third software component re-exports a set of exported software packages of the second software component, undertaking the steps of:
a) obtaining a reference to a fourth software component from the class loading delegation network, the fourth software component importing software packages from the third software component; and
b) requesting the class from the third software component.

5. An apparatus for a first software component in a class loading delegation network to obtain a class definition for a serialized software object, the software object implementing a software interface defined by a second software component and having associated a class defined by a third software component unrelated to the first software component, the apparatus comprising:
at least one processor;
a computer readable medium storing instruction for controlling the at least one processor to perform the steps of:
accessing an application programming interface (API) of the class loading delegation network that maintains a list of software components that import interfaces in the class loading delegation network the API being separate from the first software component, the second software component, and the third software component;
obtaining a reference to the third software component from the class loading delegation network using an identifier of the software interface;
requesting the class from the third software component;
requesting the class from the second software component, the second software component providing feedback to the request;
wherein obtaining a reference to the third software component and requesting the class from the third software component are performed in response to the feedback from the second software component; and
wherein if the feedback comprises an indication that the second software component is unable to provide the class, and the steps of obtaining a reference to the third software component and requesting the class from the third software component are performed in response to the indication that the second software component is unable to provide the class.

6. The apparatus of claim 5, wherein the third software component stores an entry for the class in a data structure accessible by each of the first and third software components, the entry having associated an identifier of the software interface.

7. The apparatus of claim 6, wherein the class loading delegation network is an Open Services Gateway initiative (OSGi) framework, and the first, second and third software components are bundles executable in the OSGi framework.

8. The apparatus of claim 7, further, in response to a determination that the third software component is unable to provide the class, comprising:
in response to a determination that the third software component re-exports a set of exported software packages of the second software component, undertaking the steps of:
a) obtaining a reference to a fourth software component from the class loading delegation network, the fourth software component importing software packages from the third software component; and
b) requesting the class from the third software component.

9. An apparatus comprising:
a central processing unit;
a memory subsystem;
an input/output subsystem; a bus subsystem interconnecting the central processing unit, the memory subsystem, the input/output subsystem; and
an additional apparatus for a first software component in a class loading delegation network to obtain a class definition for a serialized software object, the software object implementing a software interface defined by a second software component and having associated a class defined by a third software component unrelated to the first software component, the additional apparatus comprising:
means for accessing an application programming interface (API) of the class loading delegation network that maintains a list of software components that import interfaces in the class loading delegation network the API being separate from the first software component, the second software component, and the third software component;
means for obtaining a reference to the third software component from the class loading delegation network using an identifier of the software interface;
means for requesting the class from the third software component;
wherein the additional apparatus further comprises means for requesting the class from the second software component, the second software component providing feedback to the request, and wherein the means for obtaining a reference to the third software component and requesting the class from the third software component are operable in response to the feedback from the second software component; and
wherein the feedback comprises an indication that the second software component is unable to provide the class, and wherein the means for obtaining a reference to the third software component and the means for requesting the class from the third software component are operable in response to the indication that the second software component is unable to provide the class.

10. A computer program element comprising computer program code embedded in a non-transitory computer-readable medium that, when loaded into a computer system and executed thereon, causes the computer, for a first software component in a class loading delegation network to obtain a class definition for a serialized software object, the software object implementing a software interface defined by a second software component and having associated a class defined by a third software component unrelated to the first software component, to perform the steps of:

accessing an application programming interface (API) of the class loading delegation network that maintains a list of software components that import interfaces in the class loading delegation network the API being separate from the first software component, the second software component, and the third software component;

obtaining a reference to the third software component from the class loading delegation network using an identifier of the software interface;

requesting the class from the third software component;

requesting the class from the second software component, the second software component providing feedback to the request; wherein the steps of obtaining a reference to the third software component and requesting the class from the third software component are in response to the feedback from the second software component; and     wherein the feedback comprises an indication that the second software component is unable to provide the class, and wherein the steps of obtaining a reference to the third software component and requesting the class from the third software component are in response to the indication that the second software component is unable to provide the class.

11. The computer product element of claim 10, wherein the third software component stores an entry for the class in a data structure accessible by each of the first and third software components, the entry having associated an identifier of the software interface.

* * * * *